United States Patent
Lee et al.

(10) Patent No.: US 11,341,776 B2
(45) Date of Patent: May 24, 2022

(54) METHOD, ELECTRONIC APPARATUS AND RECORDING MEDIUM FOR AUTOMATICALLY CONFIGURING SENSORS

(71) Applicant: HTC Corporation, Taoyuan (TW)

(72) Inventors: Yu-Cheng Lee, Taoyuan (TW); Ting-Pang Hsia, Taoyuan (TW)

(73) Assignee: HTC Corporation, Taoyuan (TW)

( * ) Notice: Subject to any disclaimer, the term of this patent is extended or adjusted under 35 U.S.C. 154(b) by 1350 days.

(21) Appl. No.: 15/648,460

(22) Filed: Jul. 13, 2017

(65) Prior Publication Data

US 2018/0015327 A1     Jan. 18, 2018

Related U.S. Application Data

(60) Provisional application No. 62/362,594, filed on Jul. 15, 2016.

(51) Int. Cl.
*G06V 40/20*     (2022.01)
*G06F 3/01*     (2006.01)
*A63B 24/00*     (2006.01)

(52) U.S. Cl.
CPC .......... *G06V 40/23* (2022.01); *A63B 24/0003* (2013.01); *A63B 24/0006* (2013.01);
(Continued)

(58) Field of Classification Search
CPC ............ G06K 9/00342; A63B 24/0003; A63B 24/0006; A63B 24/0062;
(Continued)

(56) References Cited

U.S. PATENT DOCUMENTS 9,067,097 B2    6/2015   Lane et al.
10,768,196 B2 *   9/2020   Hoque ................... H04B 1/385
(Continued)

FOREIGN PATENT DOCUMENTS

| CN | 201431466 | 3/2010 |
|---|---|---|
| CN | 103200185 | 7/2013 |

(Continued)

OTHER PUBLICATIONS

"Office Action of Taiwan Counterpart Application", dated Jul. 3, 2019, pp. 1-9.

(Continued)

*Primary Examiner* — Quan Zhen Wang
*Assistant Examiner* — Mancil Littlejohn, Jr.
(74) *Attorney, Agent, or Firm* — JCIPRNET

(57) ABSTRACT

A method, an electronic apparatus and a recording medium for automatically configuring a plurality of sensing devices, applicable to an electronic apparatus having at least one sensor and a communication device, is provided. In the method, a first sensing data is detected by using the at least one sensor. A plurality of second sensing data is respectively received from the plurality of sensing devices by using the communication device. The first sensing data and each of the second sensing data are analyzed to obtain a moving pattern of the electronic apparatus and each of the sensing devices. A position on a user's body of each of the sensing devices is configured by comparing the moving patterns with at least one movement model.

16 Claims, 8 Drawing Sheets

(52) U.S. Cl.
CPC .............. *G06F 3/011* (2013.01); *G06F 3/014* (2013.01); *G06F 3/017* (2013.01); *A63B 24/0062* (2013.01); *A63B 2024/0009* (2013.01); *A63B 2024/0015* (2013.01)

(58) Field of Classification Search
CPC .... A63B 2024/0009; A63B 2024/0015; A63B 24/0087; A63B 71/0619; A63B 2071/0666; G06F 3/011; G06F 3/014; G06F 3/017
See application file for complete search history.

(56) References Cited

U.S. PATENT DOCUMENTS

| | | | | |
|---|---|---|---|---|
| 2003/0210143 | A1* | 11/2003 | Haddad | G08G 1/20 340/539.13 |
| 2005/0126026 | A1 | 6/2005 | Townsend et al. | |
| 2010/0152620 | A1* | 6/2010 | Ramsay | G16H 40/67 600/595 |
| 2012/0188158 | A1* | 7/2012 | Tan | G06F 3/017 345/156 |
| 2013/0162423 | A1 | 6/2013 | Rowe et al. | |
| 2014/0257743 | A1 | 9/2014 | Lokshin et al. | |
| 2014/0266780 | A1 | 9/2014 | Rahman et al. | |
| 2015/0094142 | A1* | 4/2015 | Stafford | G06F 3/017 463/31 |
| 2015/0106052 | A1* | 4/2015 | Balakrishnan | G06N 5/04 702/150 |
| 2015/0366504 | A1 | 12/2015 | Connor | |
| 2016/0199693 | A1 | 7/2016 | Vermilyea et al. | |
| 2017/0196513 | A1* | 7/2017 | Longinotti-Buitoni | A61B 5/6805 |

FOREIGN PATENT DOCUMENTS

| | | |
|---|---|---|
| CN | 103562952 | 2/2014 |
| CN | 104159508 | 11/2014 |
| CN | 104395929 | 3/2015 |
| CN | 204519638 | 8/2015 |
| CN | 105739525 | 7/2016 |
| EP | 3089028 | 11/2016 |
| TW | 201224516 | 6/2012 |
| TW | 201402069 | 1/2014 |
| TW | M523906 | 6/2016 |
| WO | 2011058584 | 5/2011 |
| WO | 2015103061 | 7/2015 |
| WO | 2016014871 | 1/2016 |

OTHER PUBLICATIONS

"Office Action of Taiwan Counterpart Application", dated Mar. 28, 2018, p. 1-p. 11.
"Search Report of Europe Counterpart Application", dated Jan. 16, 2018, p. 1-p. 16, in which the listed references were cited.
"Office Action of Taiwan Counterpart Application", dated Apr. 29, 2020, p. 1-p. 10.
"Office Action of China Counterpart Application", dated Dec. 26, 2018, p. 1-p. 8.
"Notice of Allowance of China Counterpart Application," dated Jul. 14, 2021, pp. 1-3.

* cited by examiner

METHOD, ELECTRONIC APPARATUS AND RECORDING MEDIUM FOR AUTOMATICALLY CONFIGURING SENSORS

CROSS REFERENCE TO RELATED APPLICATION

This application claims the priority benefit of U.S. provisional application Ser. No. 62/362,594, filed on Jul. 15, 2016. The entirety of the above-mentioned patent application is hereby incorporated by reference herein and made a part of specification.

FIELD OF THE INVENTION

The application is directed to a configuration method, and more particularly to a method and an electronic apparatus for automatically configuring sensors.

DESCRIPTION OF RELATED ART

Along with the development of technologies, electronic devices have become smaller and more powerful. Currently, miniature electronic device with various functions could be worn by a person without causing uncomfortableness, so it becomes more popular. In general, wearable devices are able to perform some basic functions, such as timekeeping, calculation, game-playing, and the like. Some of them are able to run applications, programs or even an operating system, such that those wearable devices are suitable being applied in healthcare, wireless communication, or sport or exercise track.

SUMMARY

However, when applying the wearable devices or sensors, miscellaneous configuration steps are usually required to ensure the wearable devices or sensors function normally. For example, in the first use or every use of the wearable devices or sensors, the user is required to configure the position or orientation of the wearable devices being worn or placed on the user's body. For the wearable devices or sensors configured by the user or pre-configured before the user uses them, the user still needs to recognize and distinguish each wearable device or sensor and put it on the right position of the body according to the configuration. For sports or exercise tracking, the user is further required to configure the type, strength, and/or amount of workout to be exercised; otherwise, the wearable devices or sensors cannot provide records, guidance or suggestions that are appropriate and useful to the user during the sports or exercises.

The disclosure provides a method, an electronic apparatus, and a recording medium for configuring sensors, capable of automatically configuring sensors worn by or placed on a user without the need to do manual settings or recognize the right sensors for different positions of the user's body.

The disclosure provides a method for automatically configuring a plurality of sensing devices, which is applicable to an electronic apparatus having at least one sensor and a communication device. In the method, a first sensing data is detected by using the at least one sensor. A plurality of second sensing data is respectively received from the plurality of sensing devices by using the communication device. The first sensing data and each of the second sensing data are analyzed to obtain a moving pattern of the electronic apparatus and each of the sensing devices. A position on a user's body of each of the sensing devices is configured by comparing the moving patterns with at least one movement model.

In an example of the disclosure, the method further comprises configuring the electronic apparatus as being worn by or placed on one of the left wrist, the right wrist, the left ankle, the right ankle, the chest of a user, and wherein the step of configuring the position on the user's body of each of the sensing devices by comparing the moving patterns with the at least one movement model comprises configuring the position on the user's body of each of the sensing devices by comparing the moving patterns with the at least one movement model with reference to the position on the user's body of the electronic apparatus.

In an example of the disclosure, the position on the user's body of the electronic apparatus is configured as being worn or placed on the left wrist or the right wrist, and wherein the step of configuring the position on the user's body of each of the sensing devices by comparing the moving patterns with the at least one movement model with reference to the position on the user's body of the electronic apparatus comprises comparing a swing direction of each of the second sensing data with the swing direction of the first sensing data, wherein in response to the swing direction of the second sensing data to be compared being the same as the swing direction of the first sensing data, the sensing device detecting the second sensing data is configured as being worn by or placed on the left ankle or the right ankle of the user which is on a side opposite to the side of the electronic apparatus; in response to the swing direction of the second sensing data to be compared being opposite to the swing direction of the first sensing data, and a swing amplitude of the second sensing data being consistent with a swing amplitude of the first sensing data, the sensing device detecting the second sensing data is configured as being worn by or placed on the other one of the left wrist and the right wrist; and in response to the swing direction of the second sensing data to be compared being opposite to the swing direction of the first sensing data, and the swing amplitude of the second sensing data being not consistent with the swing amplitude of the first sensing data, the sensing device detecting the second sensing data is configured as being worn by or placed on the left ankle or the right ankle which is on a side the same as the side of the electronic apparatus.

In an example of the disclosure, the position on the user's body of the electronic apparatus is configured as being worn or placed on the left wrist or the right wrist, and the step of configuring the electronic apparatus as being worn by or placed on one of the left wrist and the step of configuring the position on the user's body of each of the sensing devices by comparing the moving patterns with the at least one movement model with reference to the position on the user's body of the electronic apparatus comprises comparing a moving direction of one of the second sensing data with the moving direction of the first sensing data, wherein in response to the moving direction of the second sensing data to be compared having been the same as the moving direction of the first sensing data within a period of time, the electronic apparatus configures the sensing device detecting the second sensing data as being worn by or placed on the other one of the left wrist and the right wrist.

In an example of the disclosure, the position on the user's body of the electronic apparatus is configured as being worn or placed on the left wrist or the right wrist, and wherein the step of configuring the position on the user's body of each of the sensing devices by comparing the moving patterns with the at least one movement model with reference to the position on the user's body of the electronic apparatus comprises comparing a moving status of one of the second sensing data with the moving status of the first sensing data; and in response to the moving status of the second sensing data to be compared being determined as static when moving status of the first sensing data is determined as moving, configuring the sensing device detecting the second sensing data as being worn by or placed on the other one of the left wrist and the right wrist.

In an example of the disclosure, the position on the user's body of the electronic apparatus is configured as being worn or placed on the left wrist or the right wrist, and wherein the step of configuring the position on the user's body of the electronic apparatus and each of the sensing devices by comparing the moving patterns with the at least one movement model with reference to the position on the user's body of the electronic apparatus comprises comparing a moving amplitude of one of the second sensing data with a moving amplitude of the first sensing data; and in response to the moving amplitude of the second sensing data to be compared being the same as the moving amplitude of the first sensing data, configuring the sensing device detecting the second sensing data as being worn by or placed on the other one of the left wrist and the right wrist.

In an example of the disclosure, the method further comprises determining whether the successively obtained moving patterns of the electronic apparatus and each of the sensing devices does not match any one of the moving patterns recorded in the determined movement model, wherein in response to the successively obtained moving patterns going beyond the moving patterns recorded in the determined movement model, a new movement model is created to record the obtained moving patterns; and in response to the successively obtained moving patterns not matching any one of the moving patterns recorded in the determined movement model, a new movement model is created to record the successively obtained moving patterns.

In an example of the disclosure, the method further comprises prompting a message to request a user to do a predetermined action corresponding to the at least one movement model.

In an example of the disclosure, the at least one sensor comprises a distance measuring sensor and a direction sensor, and the method further comprises detecting a third electronic apparatus nearby the electronic apparatus and measuring a distance and a direction of the detected third electronic apparatus relative to the electronic apparatus by using the distance measuring sensor and the direction sensor.

In an example of the disclosure, the method further comprises receiving a third sensing data from the nearby third electronic apparatus, wherein the third sensing data are collected from a plurality of sensing devices worn by or placed on a nearby user, and representing a presence or an action of the nearby user according to the received third sensing data.

The disclosure provides an electronic apparatus for automatically configuring a plurality of sensing devices, which comprises at least one sensor, a communication device, a storage device and a processor. The at least one sensor is configured to detect a first sensing data of the electronic apparatus. The communication device is configured to establish a wireless connection with the plurality of sensing devices to respectively receive a plurality of second sensing data from the sensing devices. The storage device is configured to store at least one movement model. The processor is coupled to the at least one sensor, the communication device and the storage device and configured to analyze the first sensing data and each of the second sensing data to obtain a moving pattern of the electronic apparatus and each of the sensing devices, and configures a position on a user's body of each of the sensing devices by comparing the moving patterns with the at least one movement model stored in the storage device.

The disclosure provides a non-transitory recording medium for recording a computer program to be loaded by an electronic apparatus to execute steps of: detecting a first sensing data by using at least one sensor of the electronic apparatus; respectively receiving a plurality of second sensing data from a plurality of sensing devices by using a communication device of the electronic apparatus; analyzing the first sensing data and each of the second sensing data to obtain a moving pattern of the electronic apparatus and each of the sensing devices; and configuring a position on a user's body of each of the sensing devices by comparing the moving patterns with at least one movement model.

To sum up, in the method, the electronic apparatus and the recording medium for configuring sensors, the electronic apparatus collects and analyzes sensing data detected by internal sensors and received from external sensing devices worn by or placed on different portions of a user so as to obtain the moving patterns of each device and determine a position of each device by comparing the moving patterns with predetermined movement model. As a result, an intuitive and convenient way to configure sensors is obtained.

In order to make the aforementioned and other features and advantages of the invention more comprehensible, several examples accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate exemplary examples of the disclosure and, together with the description, serve to explain the principles of the disclosure.

DESCRIPTION OF EMBODIMENTS

Figure 1:
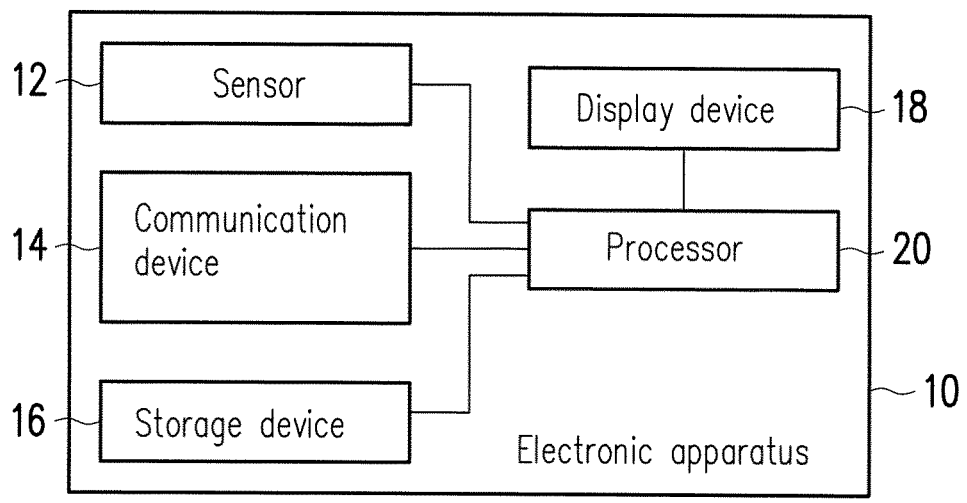
FIG. 1 is a block diagram of an electronic apparatus for automatically configuring sensors according to an example of the disclosure.

Reference will now be made in detail to the present exemplary examples of the disclosure, examples of which are illustrated in the accompanying drawings. Wherever possible, the same reference numbers are used in the drawings and the description to refer to the same or like parts.

FIG. 1 is a block diagram of an electronic apparatus for automatically configuring sensors according to an example of the present disclosure. Referring to FIG. 1, the electronic apparatus 10 of the present example is, for example, a smartphone, a personal digital assistant (PDA), a smart watch, a smart wristband, smart glasses, a virtual reality (VR) device, an augmented reality (AR) device, a mixed reality (MR) device, a head-mounted display (HMD), or any other kind of portable or wearable devices. The electronic apparatus 10 may also be any kind of sensing device having basic computing power. The electronic apparatus 10 includes at least one sensor 12, a communication device 14, a storage device 16, a display device 18, and a processor 20, and functions thereof are respectively described below.

The sensor 12 may be, for example, an accelerometer sensor, a gyroscope, a digital compass, an optical sensor, an electrical activity sensor, or other similar sensors, or a combination of the above sensors, for detecting acceleration, an orientation, an inclination angle, a rotation angle, or a facing direction of the electronic apparatus 10.

The communication device 14 is, for example, a wireless fidelity (Wi-Fi) module, a Bluetooth module, a Bluetooth low energy (BLE) module, an infrared rays (IR) module, a near-field communication (NFC) module, audio frequency communication module, an ANT+, or other similar wireless modules that consumes low energy. The communication device 14 is used to establish wireless connection with multiple sensing devices (not shown) that are worn by or placed on a human body or on clothing, accessories, hats, shoes, etc. of a user. In detail, the communication device 14 may be preset with public or proprietary profiles that are used to communicate with sensing devices, such as Generic Attribute Profile (GATT), Cycling Speed and Cadence Profile (CSCP), Generic Access Profile (GAP), Heart Rate Profile (HRP), or Serial Port Profile (SPP), such that the communication device 14 is able to search the sensing devices within a scanning range and transmit sensing data specific to various applications such as cadence speed, cadence number, balancing, cadence range, acceleration, angles, rotation angle, heart rate, or any other physical or physiological information.

It is noted, each of the aforesaid sensing devices may comprise multiple sensors such as an acceleration sensor, a gyroscope, a digital compass, an optical sensor, an electrical activity sensor, or other similar sensors, and the sensing devices may fuse the sensing data output by those sensors to conclude an orientation and a moving direction that can position the sensing device in a three-dimensional space. As a result, the sensing data received by the communication device 14 can be considerably reduced so as to save the transmission data size of the communication device 14 and the computing power of the processor 20. Moreover, the multiple sensors can be further categorized by different clusters such as head, left leg, right leg, left arm, right arm, upper body, or lower body. Each cluster group can be equipped with one or more powerful microcontroller unit (MCU) or central processing unit (CPU) that can further compute the fused data from other sensors in the same group. After processing the fused data, the processed data is then sent to the central unit for final computing and analyzing, wherein the central unit may be one of the sensors or a smartphone, a PDA, a smart watch, a smart wristband, smart glasses, a VR device, an AR device, a HMD, or any other kind of portable or wearable devices. So the architecture can be used to compute more precisely data such as floating data calculation.

The storage device 16 can be any type of a hard disk drive (HDD), or a random access memory (RAM), a read-only memory (ROM), a flash memory or other similar devices or a combination thereof. The storage device 16 is used to store applications, programs, or software to be executed by the processor 20 for performing the method for automatically configuring sensors of the present example. The storage device 16 may also be used to store the sensing data detected by the sensor 14, the sensing data received from other sensing devices, and a plurality of movement models, for example sports models, that respectively record moving patterns of different portions of a user's body when the user does a corresponding movement, for example sports.

The processor 20 is, for example, a central processing unit (CPU), microcontroller unit (MCU), a programmable microprocessor for general purpose or special purpose, a digital signal processor (DSP), a programmable controller, or other similar devices, or a combination of the above devices. The processor 20 is used for executing applications, programs, or software stored in the storage device 16 so as to perform the method for automatically configuring sensors of the present example.

Figure 2:
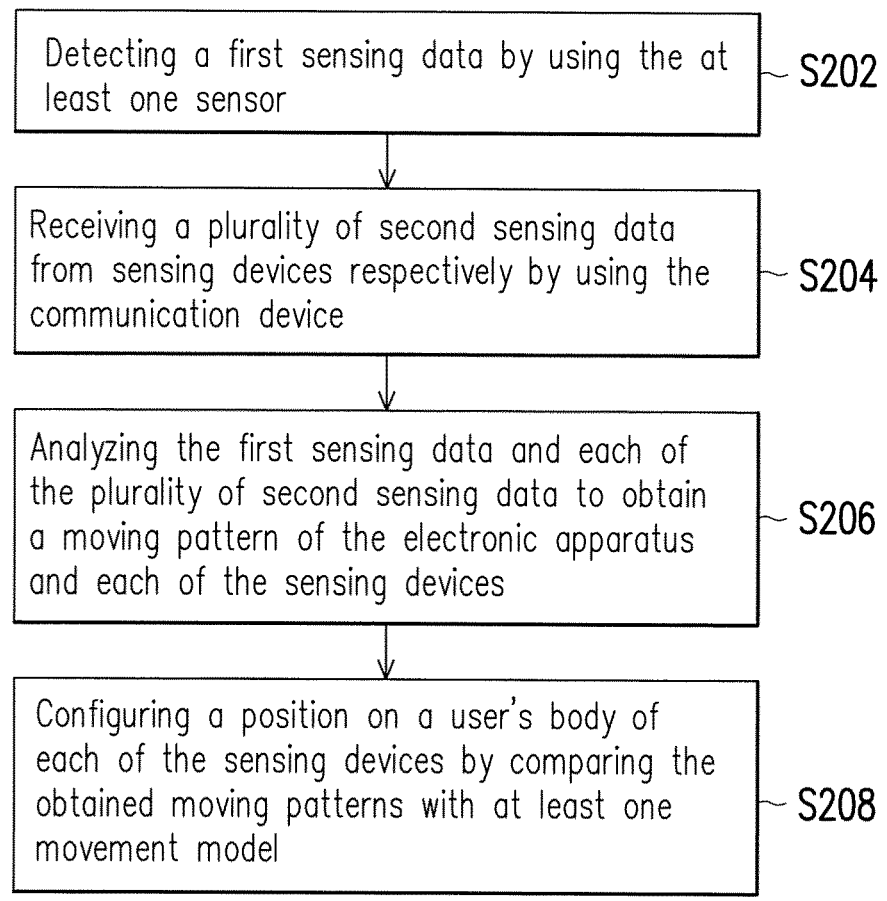
FIG. 2 is a flowchart illustrating a method for automatically configuring sensors according to an example of the disclosure.

FIG. 2 is a flowchart illustrating a method for automatically configuring sensors according to an example of the disclosure. Referring to FIG. 2, the method of the present example is applicable to the electronic apparatus 10 illustrated in FIG. 1, and detailed steps of the method for automatically configuring sensors will be described below with reference to each element of the electronic apparatus 10.

First, the processor 20 detects a first sensing data by using the sensor 12 (step S202), and receives a plurality of second sensing data from the sensing devices by using the communication device 14 (step S204). The electronic apparatus 10 and the sensing devices are worn by or placed on different portions of a user's body for detecting the movements of those portions. For example, the electronic apparatus 10 may be worn by the left wrist of the user while three sensing devices are respectively worn by the right wrist, the left ankle, and the right ankle respectively of a user and one sensing device is placed on the chest of the user. In another example, one of the sensors, e.g. the electronic apparatus 10, is on the known position, for example, the electric apparatus 10 on the left wrist acts as a base point of the body and based on this known position with corresponding human nature movement, the positions of rest of the sensing devices on different portions can be determined.

In one example, before detecting the movements, the processor 20 may prompt a message (e.g. a visual or audio message) to request the user to do a predetermined action, such as a nature movement like walking, running, waving, gestures, which is not limited thereto. As the user begins doing the action, the sensor 12 of the electronic apparatus 10 and the sensing devices simultaneously detect the sensing data, and the electronic apparatus 10 may collect the sensing data either from the sensor 12 or the sensing devices and use the same as the references to determine the positions of the electronic apparatus 10 and the sensing devices.

To be specific, the processor 20 analyzes the first sensing data and each of the plurality of second sensing data to obtain a moving pattern of the electronic apparatus 10 and each of the sensing devices (step S206). The moving patterns may represent the movements of the electronic apparatus 10 and the sensing devices in a three-dimensional space, and also may represent the movements of the portions of the user's body where the electronic apparatus 10 and the sensing devices are worn or placed.

Finally, the processor 20 configures a position on the user's body of each of the sensing devices by comparing the obtained moving patterns with at least a movement model (step S208). In one example, the movement model may be a predetermined sport model which is consistent with the action that the electronic apparatus 10 prompts the user to do before detecting the movements. In another example, the movement model may be predicted while detecting by comparing the moving patterns with a plurality of movement models pre-stored in the storage device 16. Those movement models are previously established or trained by sensing data obtained from a mass of people, from a sportsman/sportswoman, or from a trainer, or the movement models may also be trained by the previously detected sensing data of the user, which is not limited thereto. Also, the movement models may be downloaded from a cloud database or transferred from another electronic device, for example a smartphone. Each movement model may record the moving patterns of different portions of the user's body when the user does the corresponding action, and therefore through comparing the obtained moving patterns with those of the movement model, the correspondence between the portions of the user's body and the obtained moving patterns can be obtained and the positions of the devices with the moving patterns can be determined.

Based on the above, the positions of each of the sensing devices can be automatically determined and configured without the need to do manual setting, and an intuitive and convenient way to configure sensors is obtained.

Figure 3:
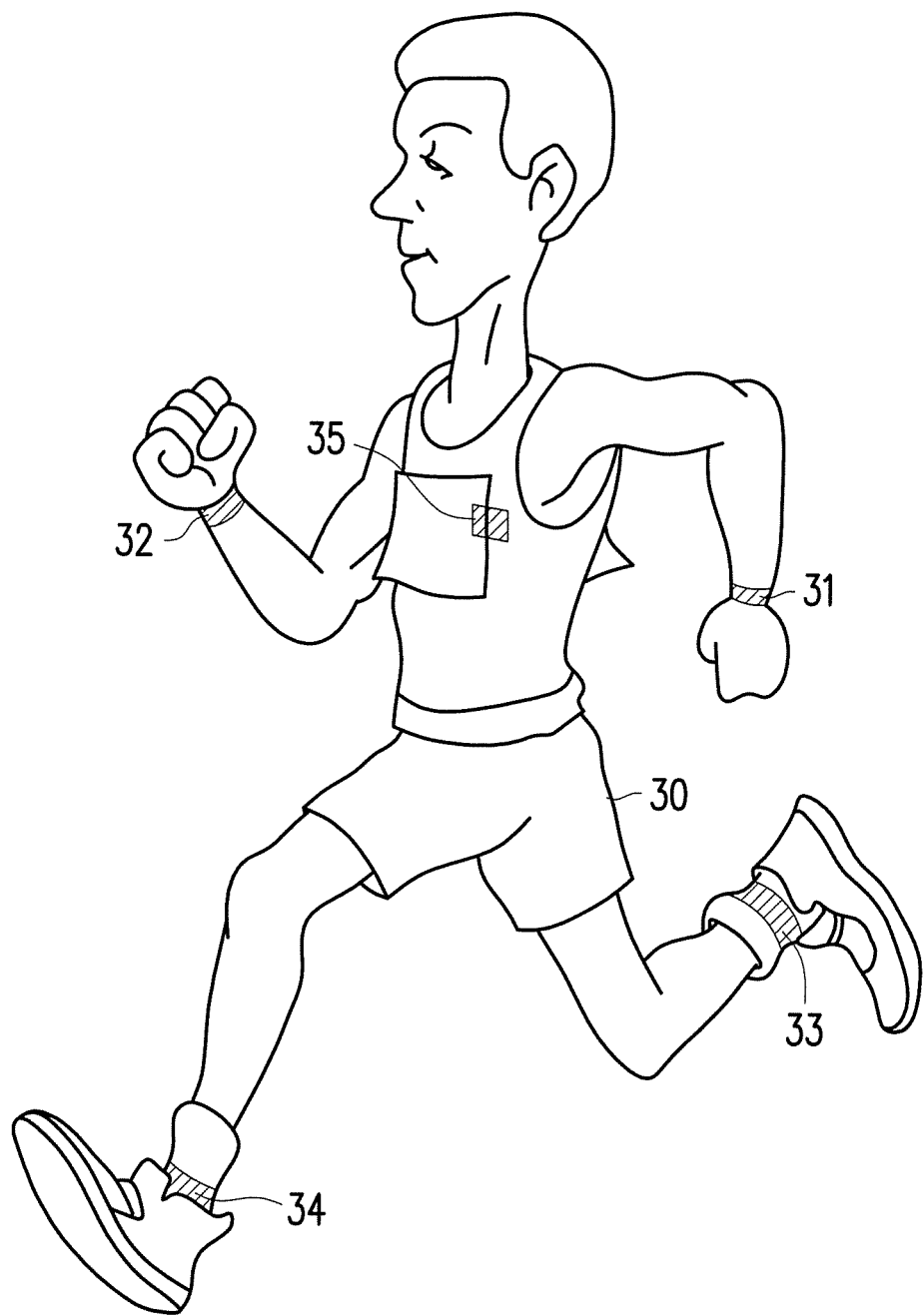
FIG. 3 is an example illustrating a method for automatically configuring sensors with a running model according to an example of the disclosure.
Figure 4:
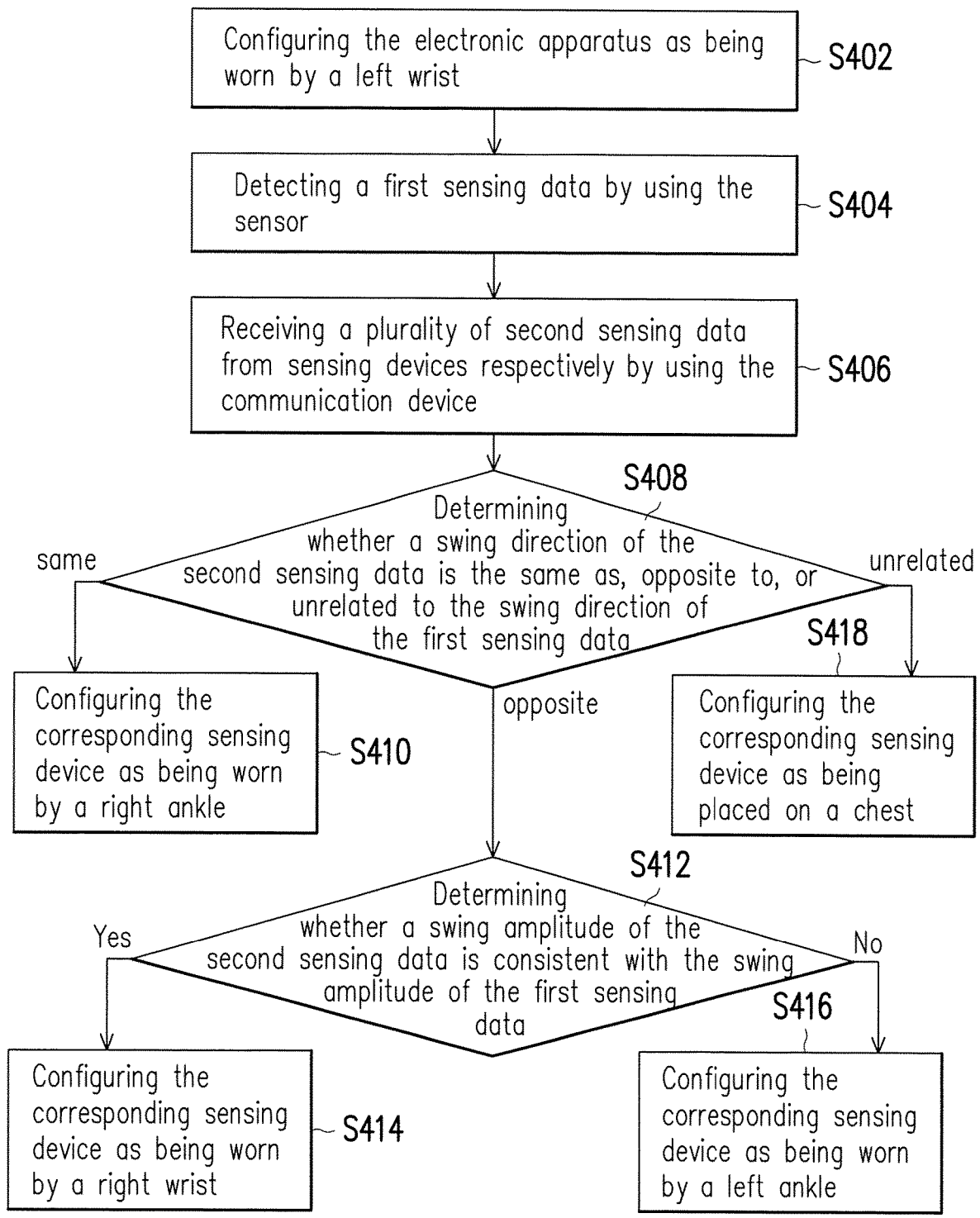
FIG. 4 is a flowchart illustrating a method for automatically configuring sensors with a running model according to an example of the disclosure.

FIG. 3 is an example illustrating a method for automatically configuring sensors with a running model according to an example of the disclosure, and FIG. 4 is a flowchart illustrating a method for automatically configuring sensors with a running model according to an example of the disclosure. Referring to FIG. 3 and FIG. 4, a user 30 wears an electronic apparatus 31 and sensing devices 32, 33, and 34 respectively by his left wrist, right wrist, right ankle, left ankle, and places the sensing device 35 on his chest. In another example, the movement model may be a walking model.

First, the user 30 may configure the electronic apparatus 31 as being worn by the left wrist (step S402), for example a smart band, a smart wristband, or a specific sensing device such as a same sensing device with a specific mark, and then begins running. In another example, the electronic device 31 may be pre-configured to a specific position of the user's body. During running, the electronic apparatus 31 detects a first sensing data by using a sensor (step S404) and receives a plurality of second sensing data from the sensing devices 32 to 35 by using the communication device (step S406). In another example, the first sensing data from the electronic apparatus 31 and the plurality of second sensing data from the sensing devices 32 to 35 may be received by another electronic device such as a smartphone, a VR, AR, or MR device, a HMD, smart glasses, or the like.

Then, whether a swing direction of the second sensing data is the same as, opposite to, or unrelated to the swing direction of the first sensing data is determined, for example, by the electronic apparatus 31 or another electronic device (step S408).

It is noted that, based on the moving patterns of the wrists, ankles, and chest in a running model, the left wrist and the right wrist swings in relatively opposite directions but swings with similar amplitude. The left wrist and the right ankle swings in a similar direction but swings with different amplitudes. The left wrist and the left ankle swings in different directions and also swings with different amplitudes. The chest does not swing but moves in a regular up and down manner along with the running steps of the user 30.

Therefore, if the swing direction of the second sensing data is determined the same as the swing direction of the first sensing data, for example, by the electronic apparatus 31 or another electronic device, the corresponding sensing device (i.e. sensing device 33) of the second sensing data is configured as being worn by the right ankle of the user 30, for example, by the electronic apparatus 31 or another electronic device (step S410).

If the swing direction of the second sensing data is determined opposite to the swing direction of the first sensing data, for example by the electronic apparatus 31 or another electronic device, a swing amplitude of the second sensing data is further determined whether consistent with the swing amplitude of the first sensing data, for example, by the electronic apparatus 31 or another electronic device (step S412).

If the swing amplitude of the second sensing data is determined consistent with the swing amplitude of the first sensing data, for example, by the electronic apparatus 31 or another electronic device, the corresponding sensing device (i.e. sensing device 32) of the second sensing data is configured as being worn by the right wrist of the user 30, for example, by the electronic apparatus 31 or another electronic device (step S414).

If the swing amplitude of the second sensing data is determined inconsistent with the swing amplitude of the first sensing data, for example, by the electronic apparatus 31 or another electronic device, the corresponding sensing device (i.e. sensing device 34) of the second sensing data is configured as being worn by the left ankle of the user 30, for example, by the electronic apparatus 31 or another electronic device (step S416).

If the swing direction of the second sensing data is determined unrelated to the swing direction of the first sensing data, for example, by the electronic apparatus 31 or another electronic device, the corresponding sensing device (i.e. sensing device 35) of the second sensing data is configured as being placed on the chest of the user 30, for example, by the electronic apparatus 31 or another electronic device (step S418). In another example, the sensing device 35 may be configured as placed on the chest or head according to the amplitude information in the second sensing data. Based on the above, the user only needs to configure one sensor (i.e. electronic apparatus 31) or only one sensor need to be pre-configured, and all the other sensors (i.e. the sensing devices 32 to 35) will be configured automatically. However, in another example, the user may not need to configure any sensor, and the positions of all the sensors can be determined and configured through comparing the moving patterns with a preset or predicted movement model. As a result, an intuitive and convenient way to configure sensors is obtained.

In another example, the position of the electronic apparatus 31, such as a smart watch or a smart wristband, is already known on the left wrist or on the right wrist, and can be a reference for determining the positions of the other sensing devices. Usually, the smart wristband or watch will ask user to configure their handedness for wearing smart wristband or watch at the first time setup. In still another example, the sensing devices 35 may be, for example, a heart rate monitor chest strap on the chest or a VR/AR/MR device, smart glasses, or a HMD on the head, and can be a reference for determining the positions of the other sensing devices.

Figure 5:
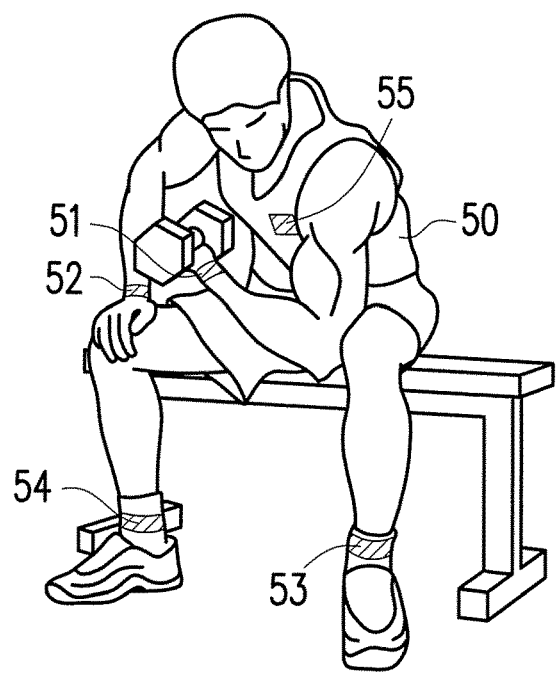
FIG. 5 is an example illustrating a method for automatically configuring sensors with a dumbbell model according to an example of the disclosure.

For similar rationale, FIG. 5 is an example illustrating a method for automatically configuring sensors with a dumbbell model according to an example of the disclosure. Referring to FIG. 5, based on the moving patterns of the wrists, ankles, and chest in a dumbbell model, only one of the left wrist and the right wrist is lifted up along with a dumbbell at a time, and the wrist being lifted up may be switched to the other wrist after a period of time when the user 50 switches the hand that lifts the dumbbell. The ankle of the leg that supports the hand lifting the dumbbell (e.g. the left leg supports the left hand as shown in FIG. 5) moves backward while the ankle of the other leg moves forward when the user 50 switches the hand that lifts the dumbbell. The chest does not move obviously when the user 50 lifts the dumbbell. Therefore, the sensing data detected by the electronic apparatus 51 itself and the sensing devices 52 to 55 may be received by, for example, the electronic apparatus 51 or another electronic devices and the moving patterns analyzed from the sensing data is compared with the aforesaid dumbbell model so as to the positions of the sensing devices 52 to 55 may be configured by, for example, the electronic apparatus 51 or another electronic devices. In another example, the position of the electronic apparatus 51, for example a smart watch or a smart wristband, is already known on the left wrist or on the right wrist and can be a reference for determining the positions of the other sensing devices. In still another example, the position of the sensing devices 55, for example a heart rate monitor chest strap, is on the chest and can be a reference for determining the positions of the other sensing devices.

For example, to be specific, first, the user 50 may configure the electronic apparatus 51 or the electronic apparatus 51 is pre-configured as being worn by the left wrist, for example a smart band or a smart wristband, and then begins lifting a dumbbell. During lifting, the electronic apparatus 51 detects a first sensing data by using a sensor and receives a plurality of second sensing data from the sensing devices 52 to 55 may be received by, for example, the electronic device 51 or another electronic device by using a communication device. Then, a moving direction of one of the second sensing data is compared with the moving direction of the first sensing data by, for example, the electronic device 51 or another electronic device.

If the moving direction of the second sensing data is determined the same as the moving direction of the first sensing data within a period of time by, for example, the electronic device 51 or another electronic device, the sensing device (i.e. sensing device 52) detecting the second sensing data is configured as being worn by or placed on the right wrist by, for example, the electronic device 51 or another electronic device. In another example, if the moving status of the second sensing data is determined static when the moving status of the first sensing data is determined moving, and vice versa, the sensing device (i.e. sensing device 52) detecting the second sensing data is configured as being worn by or placed on the right wrist.

If the moving direction of the second sensing data is determined moving forward with reference to a position of the electronic apparatus 51 and then the electronic apparatus 51 is moving up, the sensing device (i.e. sensing device 53) having the second sensing data is configured as being worn by or placed on the left ankle of the user which is on a side the same as the side of the electronic apparatus 51.

If the moving direction of the second sensing data is determined moving backward with reference to a position of the electronic apparatus 51 and then the electronic apparatus 51 is moving up, the sensing device (i.e. sensing device 54) having the second sensing data is configured as being worn by or placed on the right ankle which is on a side opposite to the side of the electronic apparatus 51.

If the moving direction of the second sensing data is determined unrelated to the moving direction of the first sensing data, the corresponding sensing device (i.e. sensing device 55) detecting the second sensing data is configured as being placed on the chest of the user 50.

Figure 6:
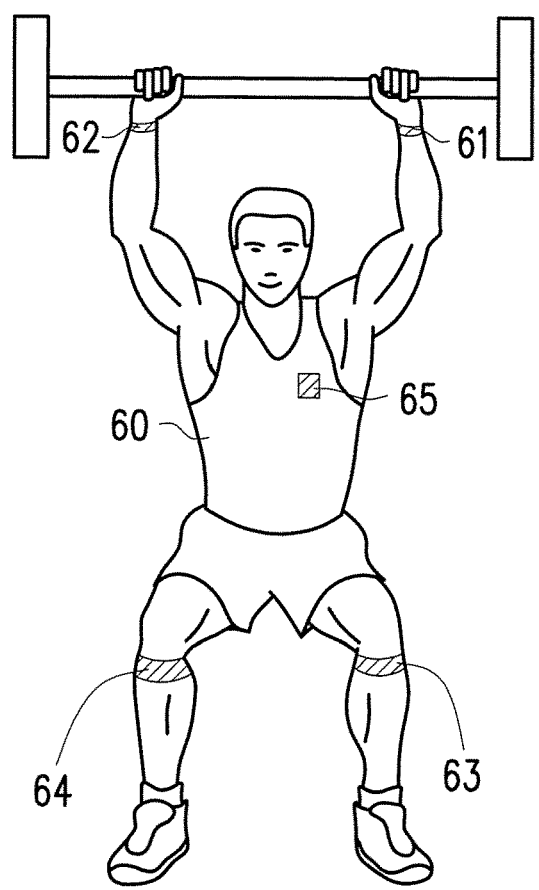
FIG. 6 is an example illustrating a method for automatically configuring sensors with a barbell model according to an example of the disclosure.

FIG. 6 is an example illustrating a method for automatically configuring sensors with a barbell model according to an example of the disclosure. Referring to FIG. 6, based on the moving patterns of the wrists, knees, and chest in a barbell model, the two wrists are simultaneously lifted up and lowered down along with the two knees, but the moving amplitudes of the knees are less than those of the wrists. The chest also moves up and down along with the wrists and the knees when the user 60 lifts the barbell, but the moving amplitude of the chest is between the moving amplitudes of the wrists and the moving amplitudes of the knees. Therefore, the sensing data detected by the electronic apparatus 61 itself and the sensing devices 62 to 65 may be received by, for example, the electronic apparatus 61 or another electronic devices and the moving patterns analyzed from the sensing data is compared with the aforesaid barbell model so as to the positions of the sensing devices 62 to 65 may be configured by the electronic apparatus 61 or another electronic devices. In another example, the position of the electronic apparatus 61, for example a smart watch or a smart wristband, is already known on the left wrist or on the right wrist and can be a reference for determining the positions of the other sensing devices. In still another example, the position of the sensing devices 65, for example a heart rate monitor chest strap, is on the chest and can be a reference for determining the positions of the other sensing devices.

For example, to be specific, first, the user 60 may configure the electronic apparatus 61 or the electronic apparatus 61 is pre-configured as being worn by the left wrist, for example a smart band or a smart wristband, and then begins lifting a barbell. During lifting, the electronic apparatus 61 detects a first sensing data by using a sensor and receives a plurality of second sensing data from the sensing devices 62 to 65 may be received by, for example, the electronic device 61 or another electronic device by using a communication device. Then, a moving amplitude of one of the second sensing data is compared with the moving amplitude of the first sensing data by, for example, the electronic device 61 or another electronic device.

If the moving amplitude of the second sensing data is determined the same as the moving amplitude of the first sensing data, the sensing device (i.e. sensing device 62)

detecting the second sensing data is configured as being worn by or placed on the right wrist.

Based on the rules that the moving amplitudes of the knees are less than those of the wrists and the moving amplitude of the chest is between the moving amplitudes of the wrists and the moving amplitudes of the knees, if the moving amplitude of the second sensing data is determined less than the moving amplitude of the first sensing data for a first amount, the sensing device (i.e. sensing device 63 or 64) detecting the second sensing data is configured as being worn by or placed on one of the left knee and the right knee of the user.

If the moving amplitude of the second sensing data is determined less than the moving amplitude of the first sensing data for a second amount, the sensing device (i.e. sensing device 65) detecting the second sensing data is configured as being worn by or placed on the chest of the user, wherein the second amount is larger than the first amount.

There may be different kinds of dumbbell models for different kinds of dumbbell exercises and different kinds of barbell models for different kinds of barbell exercises. In some models, for example, only the moving patterns of one wrist, two wrists, one wrist and chest, or two wrists and chest needed to be detected and analysis, and therefore only one sensing device on one wrist, two sensing devices on two wrists or one wrist and chest, or three sensing devices on two wrests and chest may be used for detecting the movement of the user in these dumbbell and barbell models.

As mentioned above, the movement models to be compared with the moving patterns of the sensors can be trained by the detected sensing data of the user. In addition, the present disclosure further allows the user to create his own movement model according to his habit or actual need.

Figure 7:
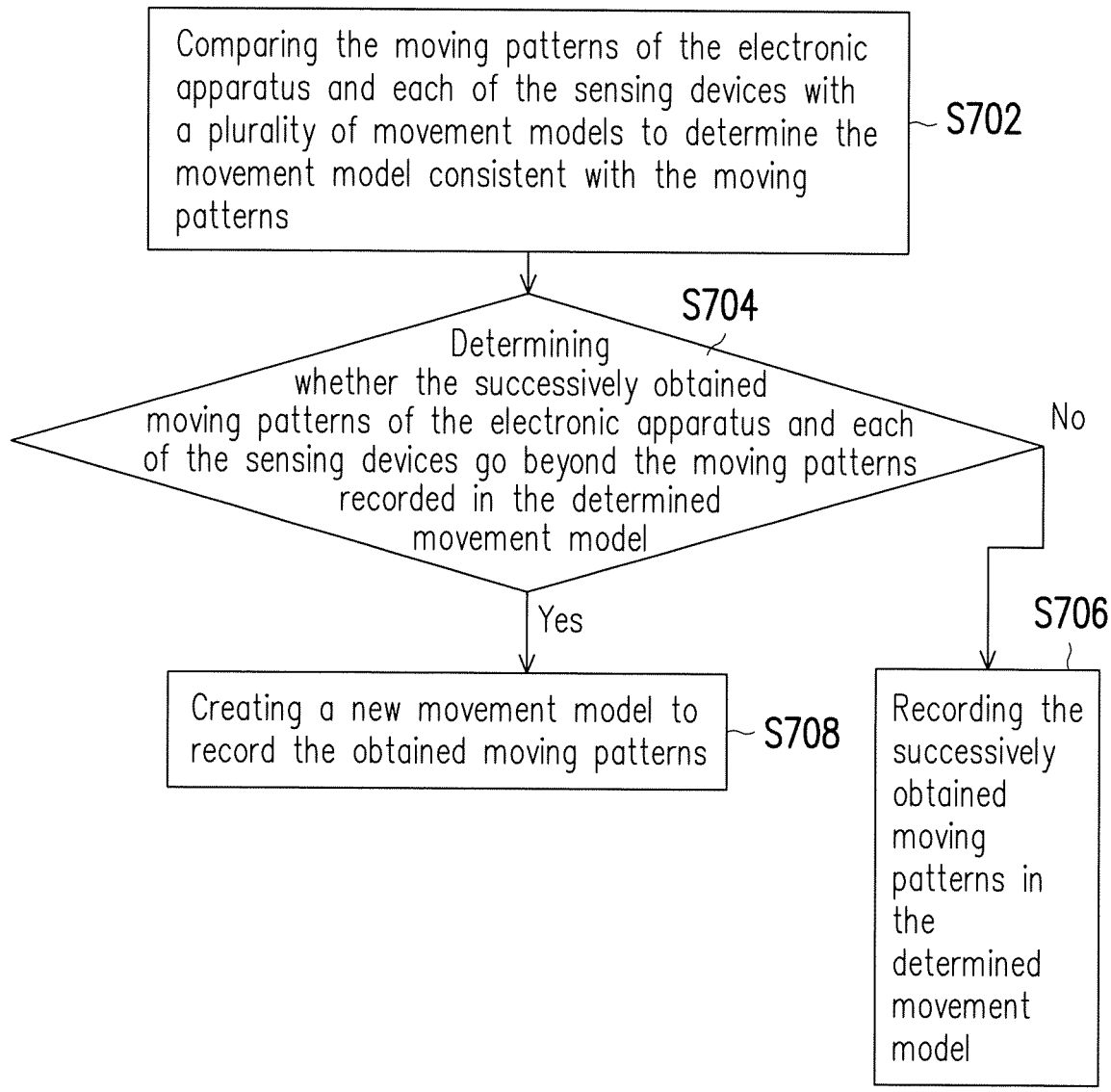
FIG. 7 is a flowchart illustrating a method for automatically configuring sensors according to an example of the disclosure.

FIG. 7 is a flowchart illustrating a method for automatically configuring sensors according to an example of the disclosure. Referring to FIG. 7, the method of the present examples is subsequent to the step S206 in FIG. 2.

That is, after the processor 20 analyzes the first sensing data and each of the plurality of second sensing data to obtain the moving patterns of the electronic apparatus 10 and each of the sensing devices, the processor 20 further compares the moving patterns of the electronic apparatus 10 and each of the sensing devices with a plurality of movement models to determine the movement model that is consistent with the moving patterns (step S702). As mentioned above, those movement models may be previously established and stored in the storage device 16 and each of the movement model records moving patterns of different portions of a user's body when the user does a corresponding movement, for example sports or exercises. Therefore, as long as the user does an action that matches with one of the movement models, the moving patterns analyzed from the sensing data should be consistent with the moving patterns of the corresponding movement model.

It is noted that, after the movement model is determined, the processors 18 still keeps determining whether the successively obtained moving patterns (analyzed from the successively detected sensing data) of the electronic apparatus 10 and each of the sensing devices go beyond the moving patterns recorded in the determined movement model (step S704).

If the moving patterns go beyond the moving patterns of the movement model, it represents the user has a different workout plan so changes the actions or adds some actions. Accordingly, the processor 20 creates a new movement model to record the obtained moving patterns (step S706), and therefore when the user does a same action next time, the processor 20 is able to recognize such action by comparing the moving patterns with those of the recorded new movement model. In another example, the processor 20 switches to a different movement model that match the obtained moving patterns and then continually obtains the moving patterns and compares with the different movement model.

If the moving patterns do not go beyond the moving patterns of the sports model, the processor 20 may record the successively obtained moving patterns in the determined sports model (step S708) so as to adjust the movement model to fit the moving patterns that the user actually does the action via confirming with users or automatically updating by user's configuration in settings.

In another example, the aforesaid method for automatically configuring sensors may be further applied to configure the electronic apparatus worn by or placed on nearby people. To be specific, in addition to aforesaid sensors used for detecting the movements of user's body, a distance measuring sensor such as an infrared ray (IR) sensor, a passive infrared ray (PIR) sensor, an ultrasonic sensor, a millimeter wave radar, and/or a laser sensor is further used to detect nearby users and to measure distances and directions of the nearby users, and accordingly configure interactions with the electronic apparatuses of nearby users. The configurations of the sensors worn by or placed on different users may be applied to the interactions between the users in a virtual reality (VR) application.

In detail, in the VR application, users wear VR head-mounted display (HMD) so as to see VR frames through the VR HMD. However, since a vision of the user's eye to the outside world is blocked by the VR HMD, the user would not see nearby users and therefore fail to interact with the nearby users. To assist the electronic apparatus in determining the positions, including the distances and directions, of nearby users, the distance and/or directions measuring sensor worn by or placed on the user's body, especially worn on the user's head, is further adopted, so as to detect the nearby users without being blocked by the user's body. The distance and/or direction measuring sensor may be implemented in a form of glasses, an earphone, a helmet, or a mask, capable of being worn on the user's head, or particular, the distance and/or direction measuring sensor may be integrated into the VR HMD, which is not limited in the present disclosure. In another example, the distance and/or direction sensor may be implemented into devices associated with the VR HMD, for example a controller, a position tracing device, a gun device, a glove, or the like.

Figure 8:
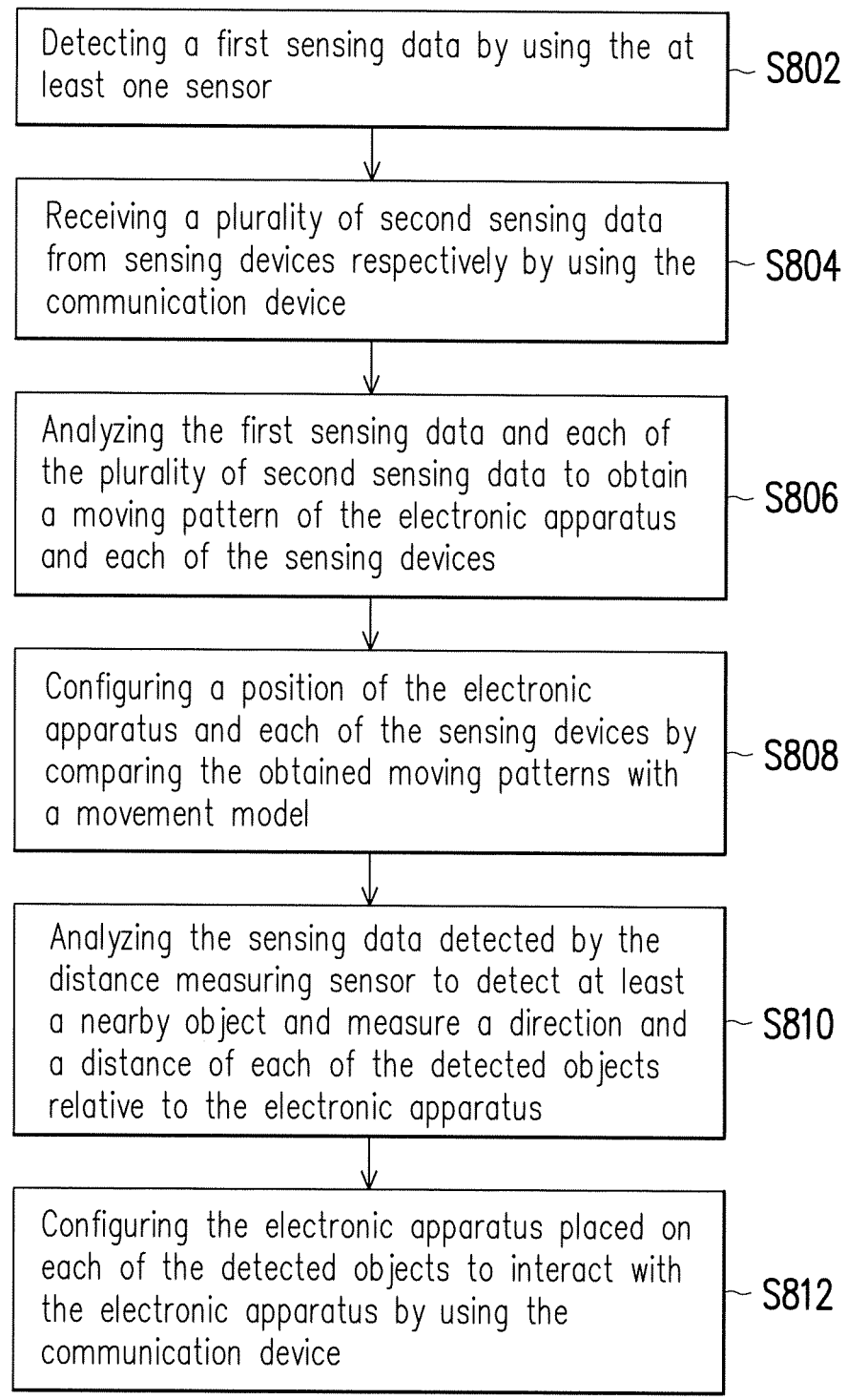
FIG. 8 is a flowchart illustrating a method for automatically configuring sensors according to an example of the disclosure.

FIG. 8 is a flowchart illustrating a method for automatically configuring sensors according to an example of the disclosure. Referring to FIG. 8, the method of the present example is applicable to the electronic apparatus 10 illustrated in FIG. 1, and detailed steps of the method for automatically configuring sensors will be described below with reference to each element of the electronic apparatus 10.

First, the processor 20 detects a first sensing data by using the sensor 12 (step S802), and receives a plurality of second sensing data from the sensing devices by using the communication device 14 (step S804).

Different from aforesaid example, in the present example, the sensing devices further include a distance and/or direction measuring sensor, and accordingly the processor 20 receives the sensing data detected and transmitted by the distance and/or direction measuring sensor, in which the sensing data may include positions, including distances and directions of nearby objects within a sensing range of the distance and/or direction measuring sensor.

Then, the processor 20 analyzes the first sensing data and each of the plurality of second sensing data to obtain a moving pattern of the electronic apparatus 10 and each of the sensing devices (step S806), and accordingly configures a position of the electronic apparatus 10 and each of the sensing devices by comparing the obtained moving patterns with at least a movement model (step S808). The configuration for the positions of the electronic apparatus 10 and the sensing devices are the same as or similar to those disclosed in steps S206 to S208 and therefore detailed description is not repeated herein.

Different from aforesaid example, in the present example, the processor 20 further analyzes the sensing data detected by the distance and direction measuring sensor so as to detect at least a nearby object and measure a direction and a distance of each of the detected objects relative to the electronic apparatus 10 (step S810).

Finally, the processor 20 configures the electronic apparatus placed on each of the detected objects so as to interact with the electronic apparatus by using the sensor 12 or communication device 14 (step S812). In detail, the processor 20 may search for nearby electronic apparatuses by broadcasting a scan signal using the communication device 14 or using optical sensor 12 to detect other sensors nearby that are not identified on user's body by auto configuration. In one example, when a nearby electronic apparatus is searched, a distance of the nearby electronic apparatus from the electronic apparatus 10 may be measured according to a signal strength of a feedback signal returned from the nearby electronic apparatus in response to the scan or detecting signal, and the direction of the nearby electronic apparatus may be determined according to the received signal and/or another sensors, for example one or more cameras to take the images of the electronics and determine the directions of the electronic apparatus according to the images. The processor 20 may compare the measured distance and direction with the previously measured distance and direction of the detected object so as to identify that the nearby electronic apparatus is located at or corresponding to the detected object and accordingly configure the nearby electronic apparatus as being placed on the detected object (i.e. the nearby user).

It is noted that, in another example, the electronic apparatus placed on the detected object (i.e. the nearby user) may function the same as the electronic apparatus 10. That is, the electronic apparatus placed on the nearby user may also collect the sensing data from the sensing devices worn by or placed on the nearby user so as to analyze the moving patterns of the electronic apparatus itself and the sensing devices. Accordingly, when the processor 20 of the electronic apparatus 10 configures the electronic apparatus placed on the nearby user, the processor 20 may further receive the analyzed moving patterns so as to obtain the action currently performed by the nearby user.

Figure 9:
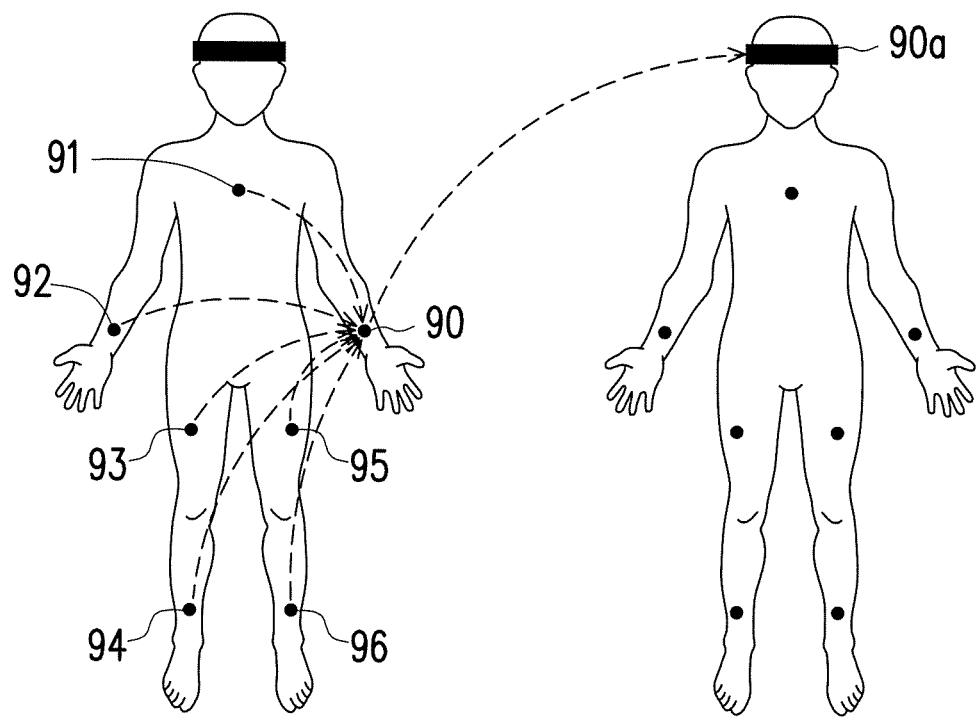
FIG. 9 is a schematic diagram illustrating a method for collecting sensing data from a nearby user according to an example of the disclosure.

For example, FIG. 9 is a schematic diagram illustrating a method for collecting sensing data from a nearby user according to an example of the disclosure. Referring to FIG. 9, the electronic apparatus 90 placed on the nearby user collects sensing data from the sensing devices 91 to 96 worn by or placed on the nearby user so as to analyze the moving patterns of the electronic apparatus 90 and the sensing devices 91 to 96. Then, the electronic apparatus 90 transmits the computed movement result to the HMD 90a worn by the user so the HMD 90a can display nearby user's movement on the display. This method can also avoid some sensing devices being blocked by nearby user's body if the HMD 90a detect the nearby user's movement by using optical technology.

Moreover, the sensors on nearby user's body can also broadcast signal so the user with HMD can directly detect those sensing devices' signal and compute nearby user's movement.

Figure 10:
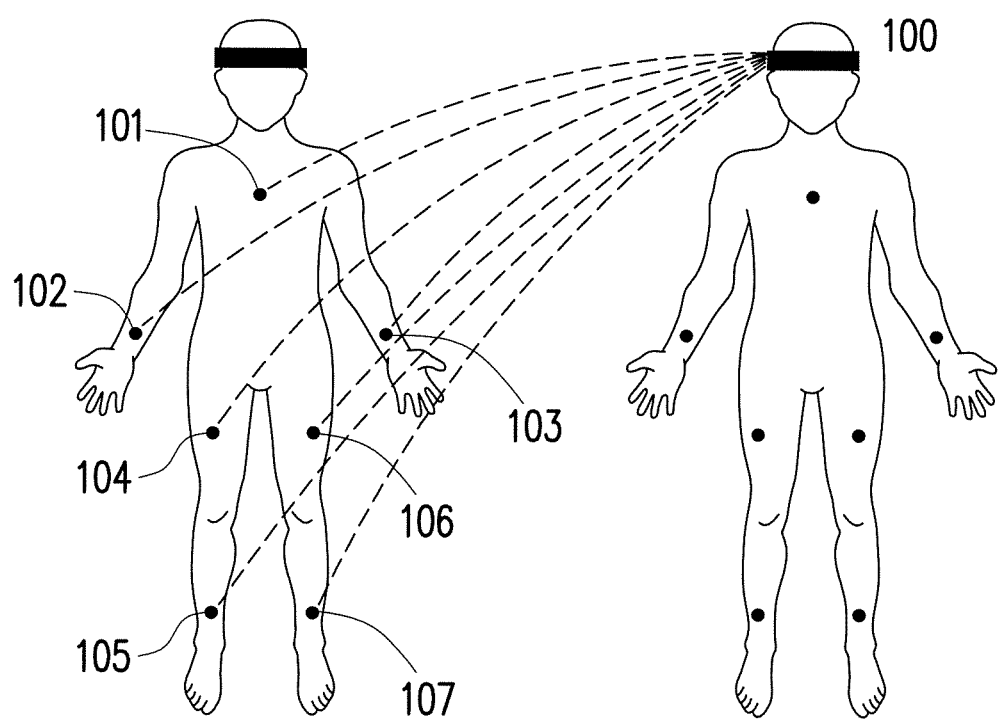
FIG. 10 is a schematic diagram illustrating a method for collecting sensing data from a nearby user according to an example of the disclosure.

For example, FIG. 10 is a schematic diagram illustrating a method for collecting sensing data from a nearby user according to an example of the disclosure. Referring to FIG. 10, each of the sensors 101 to 107 placed on the nearby user broadcasts a signal including the sensing data so that the HMD 100 worn by the user can detect those signals and compute the nearby user's movement.

As a result, when the processor 20 executes a VR application to display VR frames, the processor 20 may display an avatar to represent a presence of the nearby user in the displayed VR frames such that the user of the electronic apparatus 10 may see and may further interact with the nearby user in the VR application.

Figure 11:
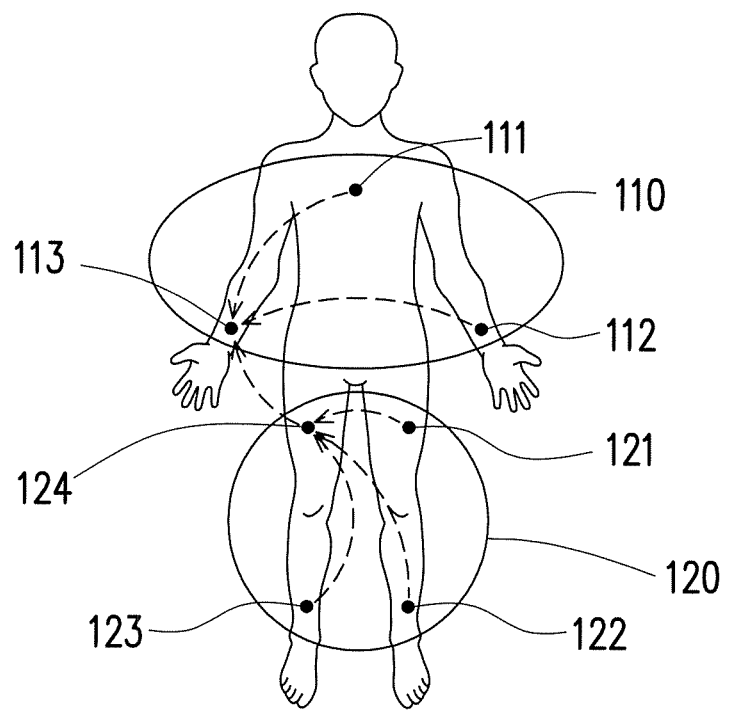
FIG. 11 is a schematic diagram illustrating a method for collecting sensing data by sensor clusters according to an example of the disclosure.

It is noted that the sensing devices worn by or placed on the user may be further divided into multiple clusters according to the located regions on the user's body, and each cluster may have a main processor to collect sensing data measured by the sensing devices within the corresponding region. For example, FIG. 11 is a schematic diagram illustrating a method for collecting sensing data by sensor clusters according to an example of the disclosure. Referring to FIG. 11, the sensing devices 111 to 113 and 121 to 124 are divided into an upper body cluster 110 and a lower body cluster 120, in which in the lower body cluster 120, there is a main sensing device 124 configured to collect the sensing data measured by the sensing devices 121 to 123 within the lower body region; while in the upper body cluster 110, there is a main sensing device 113 configured to collect the sensing data measured by the sensing devices 111 and 112 within the upper body region. One of the main sensing devices, for example the main sensing device 113 of the upper body cluster 110, may also act as a main sensing device for all body that may further receive sensing data collected by the other main sensing devices, for example the main sensing device 124 of the lower body cluster 120, so as to provide the sensing data of all of the sensing devices 111 to 113 and 121 to 124 worn by or placed on the user to nearby user's monitor device (as shown in FIG. 9).

As a result, when the processor 20 executes a VR application to display VR frames, the processor 20 may display an avatar performing the obtained location, and may also action, in the displayed VR frames. Since the displayed avatar performs the location and/or action almost the same as the action performed by the nearby user, the user of the electronic apparatus 10 may feel like the nearby user really exists in the VR world and know the position and/or the action of the nearby user so as to interact with the nearby user even though the user cannot see the real appearance of the nearby user. For the same rationale, the nearby user may also see an avatar of the user of the electronic apparatus 10 in the VR frames displayed by his electronic apparatus so as to interact with the user of the electronic apparatus 10.

The present disclosure further provides a non-transitory computer readable medium in which a computer program is record. The computer program is used to execute each step in the method for automatically configuring sensors as described above. The computer program is composed of a plurality of program code sections (i.e., building an organization diagram program code section, approving a list program code section, setting a program code section, and deploying a program code section). Moreover, after the program code sections are loaded into the electronic apparatus and executed, the steps in the method may be implemented.

To sum up, in the method, the electronic apparatus and the recording medium for automatically configuring sensors of the present disclosure, a pack of sensors are provided for the user to wear so as to monitor the movements or actions exercised by the user. The sensing data detected by those sensors are collected and analyzed to obtain the moving patterns, which are then compared with at least one previously established movement model or establish a new movement model. As a result, the positions of the sensors on the user's body can be automatically determined and configured without the need to do manual settings and also the user does not need to recognize or distinguish different sensors for different position on the body, thus the user can put any one of the sensors on any position on the body he/she want and an intuitive and convenient way to configure sensors is obtained.

Although the disclosure has been described with reference to the above examples, it will be apparent to one of the ordinary skill in the art that modifications to the described example may be made without departing from the spirit of the disclosure. Accordingly, the scope of the disclosure will be defined by the attached claims not by the above detailed descriptions.

What is claimed is:

1. A method for automatically determining positions of a plurality of sensing devices being worn by or placed on a user's body, applicable to an electronic apparatus having at least one sensor and a communication device, the method comprising:

detecting a first sensing data by using the at least one sensor;

respectively receiving a plurality of second sensing data from the plurality of sensing devices by using the communication device;

analyzing the first sensing data and each of the second sensing data to obtain a moving pattern of the electronic apparatus and each of the sensing devices; and determining a position on the user's body of each of the sensing devices by comparing the moving patterns with at least one movement model with reference to a pre-determined position on the user's body of the electronic apparatus, wherein the position on the user's body of the electronic apparatus is configured as being worn or placed on one of a left wrist, a right wrist, a left ankle, a right ankle, a chest, and a head of the user, wherein the step of determining the position on the user's body of each of the sensing devices by comparing the moving patterns with the at least one movement model with reference to the pre-determined position on the user's body of the electronic apparatus comprises:

comparing a swing direction of each of the sensing devices represented in each of the second sensing data with the swing direction of the at least one sensor represented in the first sensing data;

in response to the swing direction of the one of the sensing devices to be compared being the same as the swing direction of the at least one sensor, configuring the sensing device detecting the second sensing data as being worn by or placed on the left ankle or the right ankle of the user which is on a side opposite to the side of the electronic apparatus;

in response to the swing direction of the one of the sensing devices to be compared being opposite to the swing direction of the at least one sensor, and a swing amplitude of the second sensing data being consistent with a swing amplitude of the first sensing data, configuring the sensing device detecting the second sensing data as being worn by or placed on the other one of the left wrist and the right wrist; and in response to the swing direction of the one of the sensing devices to be compared being opposite to the swing direction of the at least one sensor, and the swing amplitude of the second sensing data being not consistent with the swing amplitude of the first sensing data, configuring the sensing device detecting the second sensing data as being won by or placed on the left ankle or the right ankle which is on a side the same as the side of the electronic apparatus.

2. The method according to claim 1, wherein the position on the user's body of the electronic apparatus is configured as being worn or placed on the left wrist or the right wrist, and wherein the step of determining the position on the user's body of each of the sensing devices by comparing the moving patterns with the at least one movement model with reference to the pre-determined position on the user's body of the electronic apparatus comprises:

comparing a moving direction of one of the second sensing data with the moving direction of the first sensing data;

in response to the moving direction of the second sensing data to be compared having been the same as the moving direction of the first sensing data within a period of time, configuring the sensing device detecting the second sensing data as being worn by or placed on the other one of the left wrist and the right wrist.

3. The method according to claim 1, wherein the position on the user's body of the electronic apparatus is configured as being worn or placed on the left wrist or the right wrist, and wherein the step of determining the position on the user's body of each of the sensing devices by comparing the moving patterns with the at least one movement model with reference to the pre-determined position on the user's body of the electronic apparatus comprises:

comparing a moving status of one of the second sensing data with the moving status of the first sensing data;

in response to the moving status of the second sensing data to be compared being determined as static when moving status of the first sensing data is determined as moving, configuring the sensing device detecting the second sensing data as being worn by or placed on the other one of the left wrist and the right wrist.

4. The method according to claim 1, wherein the position on the user's body of the electronic apparatus is configured as being worn or placed on the left wrist or the right wrist, and wherein the step of determining the position on the user's body of the electronic apparatus and each of the sensing devices by comparing the moving patterns with the at least one movement model with reference to the pre-determined position on the user's body of the electronic apparatus comprises:

comparing a moving amplitude of one of the second sensing data with a moving amplitude of the first sensing data;

in response to the moving amplitude of the second sensing data to be compared being the same as the moving amplitude of the first sensing data, configuring the sensing device detecting the second sensing data as being worn by or placed on the other one of the left wrist and the right wrist.

5. The method according to claim 1, further comprising:
determining whether the successively obtained moving patterns of the electronic apparatus and each of the sensing devices does not match any one of the movement model;
in response to the successively obtained moving patterns not matching any one of the movement model, creating a new movement model to record the successively obtained moving patterns.

6. The method according to claim 1, further comprising:
prompting a message to request a user to do a predetermined action corresponding to the at least one movement model.

7. The method according to claim 1, wherein the at least one sensor comprises a distance measuring sensor and a direction sensor, and the method further comprises:
detecting an other electronic apparatus nearby the electronic apparatus and measuring a distance and a direction of the other electronic apparatus relative to the electronic apparatus by using the distance measuring sensor and the direction sensor.

8. The method according to claim 7, wherein the method further comprises:
receiving a third sensing data from the nearby other electronic apparatus, wherein the third sensing data are collected from a plurality of sensing devices worn by or placed on a nearby user; and
representing a presence or an action of the nearby user according to the received third sensing data.

9. An electronic apparatus for automatically determining positions of a plurality of sensing devices being worn by or placed on a user's body, comprising:
at least one sensor, detecting a first sensing data of the electronic apparatus;
a communication device, establishing a wireless connection with the plurality of sensing devices to respectively receive a plurality of second sensing data from the sensing devices;
a storage device, storing at least one movement model; and
a processor, coupled to the at least one sensor, the communication device, and the storage device and configured to analyze the first sensing data and each of the second sensing data to obtain a moving pattern of the electronic apparatus and each of the sensing devices, and determines a position on the user's body of each of the sensing devices by comparing the moving patterns with the at least one movement model stored in the storage device with reference to a predetermined position on the user's body of the electronic apparatus,
wherein the position on the user's body of the electronic apparatus is configured as being worn or placed on one of a left wrist, a right wrist, a left ankle, a right ankle, a chest, and a head of the user,
wherein the processor is configured to compare a swing direction of each of the sensing devices represented in each of the second sensing data with the swing direction of the at least one sensor represented in the first sensing data and determining whether a swing amplitude of the second sensing data is consistent with a swing amplitude of the first sensing data,
in response to the swing direction of the one of the sensing devices to be compared being the same as the swing direction of the at least one sensor, the processor configures the sensing device detecting the second sensing data as being worn by or placed on the left ankle or the right ankle of the user which is on a side opposite to the side of the electronic apparatus,
in response to the swing direction of the one of the sensing devices to be compared being opposite to the swing direction of the at least one sensor, and the swing amplitude of the second sensing data being consistent with the swing amplitude of the first sensing data, the processor configures the sensing device detecting the second sensing data as being worn by or placed on the other one of the left wrist and the right wrist, and
in response to the swing direction of the second sensing data to be compared being opposite to the swing direction of the first sensing data, and the swing amplitude of the second sensing data being not consistent with the swing amplitude of the first sensing data, the processor configures the sensing device detecting the second sensing data as being worn by or placed on the left ankle or the right ankle which is on a side the same as the side of the electronic apparatus.

10. The electronic apparatus according to claim 9, wherein the processor comprises configuring the electronic apparatus as being worn by or placed on one of the left wrist and the right wrist of the user and comparing a moving direction of one of the second sensing data with the moving direction of the first sensing data, wherein
in response to the moving direction of the second sensing data to be compared having been the same as the moving direction of the first sensing data within a period of time, the processor configures the sensing device detecting the second sensing data as being worn by or placed on the other one of the left wrist and the right wrist.

11. The electronic apparatus according to claim 9, wherein the processor comprises configuring the electronic apparatus as being worn by or placed on one of the left wrist and the right wrist of the user and comparing a moving status of one of the second sensing data with the moving status of the first sensing data, wherein
in response to the moving status of the second sensing data to be compared being determined as static when moving status of the first sensing data is determined as moving, configuring the sensing device detecting the second sensing data as being worn by or placed on the other one of the left wrist and the right wrist.

12. The electronic apparatus according to claim 9, wherein the processor further determines whether the successively obtained moving patterns of the electronic apparatus and each of the sensing devices does not match any one of the moving patterns recorded in the determined movement model, wherein
in response to the successively obtained moving patterns not matching any one of the moving patterns recorded in the determined movement model, the processor creates a new movement model to record the successively obtained moving patterns.

13. The electronic apparatus according to claim 9, wherein the processor further prompts a message to request a user to do a predetermined action corresponding to the at least one movement model.

14. The electronic apparatus according to claim 9, wherein the at least one sensor comprises a distance measuring sensor and a direction sensor, and the processor further detects an other electronic apparatus nearby the electronic apparatus and measures a distance and a direction of the other electronic apparatus relative to the electronic apparatus by using the distance measuring sensor and the direction sensor.

15. The electronic apparatus according to claim 14, wherein the processor further receives a third sensing data from the nearby other electronic apparatus and executes an application to represent a presence or an action of the nearby user according to the received third sensing data.

16. A non-transitory computer readable recording medium, recording a program to be loaded by an electronic apparatus to execute steps of:
  detecting a first sensing data by using at least one sensor of the electronic apparatus;
  respectively receiving a plurality of second sensing data from a plurality of sensing devices by using a communication device of the electronic apparatus;
  analyzing the first sensing data and each of the second sensing data to obtain a moving pattern of the electronic apparatus and each of the sensing devices; and
  determining a position on a user's body of each of the sensing devices by comparing the moving patterns with at least one movement model with reference to a pre-determined position on the user's body of the electronic apparatus,
  wherein the position on the user's body of the electronic apparatus is configured as being worn or placed on one of a left wrist, a right wrist, a left ankle, a right ankle, a chest, and a head of the user,
  wherein the step of determining the position on the user's body of each of the sensing devices by comparing the moving patterns with the at least one movement model with reference to the pre-determined position on the user's body of the electronic apparatus comprises:
  comparing a swing direction of each of the sensing devices represented in each of the second sensing data with the swing direction of the at least one sensor represented in the first sensing data;
  in response to the swing direction of the one of the sensing devices to be compared being the same as the swing direction of the at least one sensor, configuring the sensing device detecting the second sensing data as being worn by or placed on the left ankle or the right ankle of the user which is on a side opposite to the side of the electronic apparatus;
  in response to the swing direction of the one of the sensing devices to be compared being opposite to the swing direction of the at least one sensor, and a swing amplitude of the second sensing data being consistent with a swing amplitude of the first sensing data, configuring the sensing device detecting the second sensing data as being worn by or placed on the other one of the left wrist and the right wrist; and
  in response to the swing direction of the one of the sensing devices to be compared being opposite to the swing direction of the at least one sensor, and the swing amplitude of the second sensing data being not consistent with the swing amplitude of the first sensing data, configuring the sensing device detecting the second sensing data as being worn by or placed on the left ankle or the right ankle which is on a side the same as the side of the electronic apparatus.

* * * * *